F. TOD.
APPARATUS FOR TEACHING BOOKKEEPING.
APPLICATION FILED MAY 10, 1921.

FREDERICK TOD
INVENTOR.

F. TOD.
APPARATUS FOR TEACHING BOOKKEEPING.
APPLICATION FILED MAY 10, 1921.
1,415,278. Patented May 9, 1922.
2 SHEETS—SHEET 2.
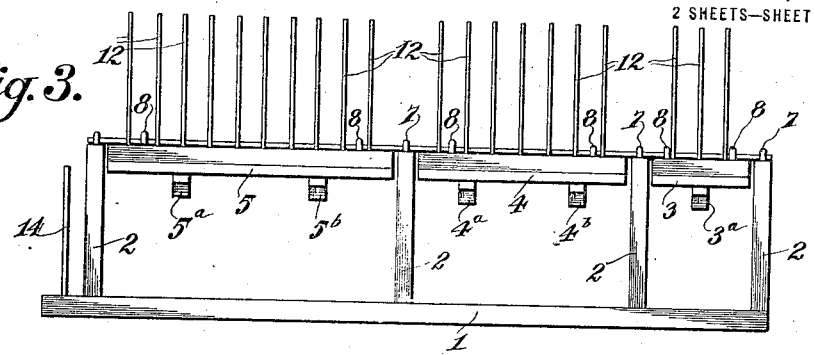
Fig. 3.
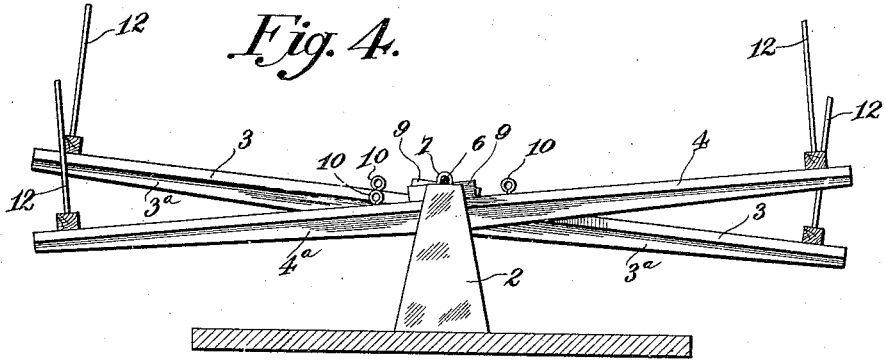
Fig. 4.
Fig. 5.
FREDERICK TOD
INVENTOR.
BY
*Cushman, Bryant & Darby*
ATTORNEY.

UNITED STATES PATENT OFFICE.

FREDERICK TOD, OF WINNIPEG, MANITOBA, CANADA.

APPARATUS FOR TEACHING BOOKKEEPING.

1,415,278.

Specification of Letters Patent.  Patented May 9, 1922.

Application filed May 10, 1921. Serial No. 468,376.

*To all whom it may concern:*

Be it known that I, FREDERICK TOD, a subject of the King of Great Britain, residing at Winnipeg, in the Province of Manitoba and Dominion of Canada, have invented new and useful Improvements in Apparatus for Teaching Bookkeeping, of which the following is a specification.

The present invention relates to an improved apparatus for teaching bookkeeping by means of which a pupil is enabled to readily grasp the principles of what is meant by "double entry" and keeping books in balance and the nature and proper record of entries in books of account in every day commercial practice.

The object of the invention is to provide means for visibly demonstrating the truth of the fundamental rule or principle of correct bookkeeping that for every debit entry there must be a corresponding credit entry and that when this rule or principle is followed the books will, necessarily, be in balance.

As a simple and convenient means for effecting such visible demonstration of said principle it is proposed to employ a lever, the arms of which will respectively represent the debit and credit columns of an account, and a series of weights representing the individual entries or items of the account, which weights may be readily applied to either arm of the lever.

In the accompanying drawings:—

Figure 3 is an end elevation;

Figure 4 is a section on the line 4—4 of Figure 2;

Figure 5 is a plan of an exercise sheet which may be employed in connection with the apparatus for carrying out the improved method.

Figure 1:
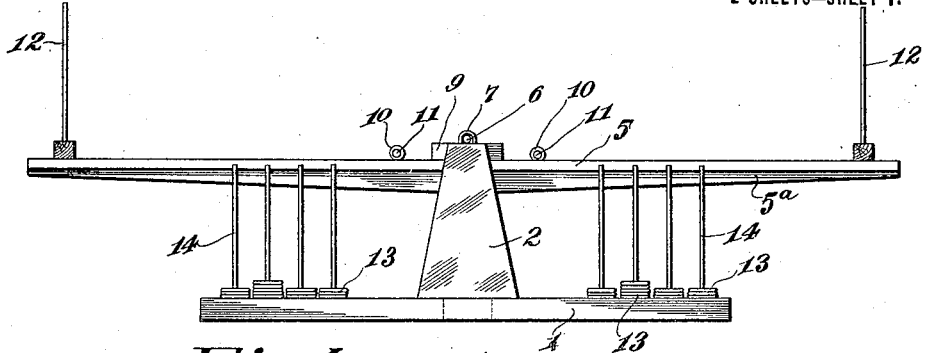
Figure 1 is a side elevation of an apparatus embodying the present invention and adapted for carrying out the method thereof.

Referring to the drawings, 1 designates a suitable base from which rise a plurality of standards or uprights 2 on which are fulcrumed a plurality of levers, each representing an account, or a series of accounts.

In the embodiment of the invention illustrated there are three of such levers, 3, 4, and 5, which, for example, are intended to severally represent a "trading account", a "profit and loss account" and a "balance sheet". The levers may be formed in any suitable manner. As shown, the lever 3 comprises a top plate or member and a depending centrally arranged rib $3^a$. The lever 4 comprises a top plate 4 and two depending ribs $4^a$, $4^b$, while the lever 5 includes a top member and two depending ribs $5^a$, $5^b$. Said levers are suitably mounted on the uprights or standards 2 to rock about a common axis. As shown, a rod 6 extends transversely through eyes 7 secured in the upper ends of the uprights or standards 2 and through generally similar eyes 8 rising from cross pieces or battens 9 extending transversely of the levers, midway of their ends. By this arrangement it will be seen that each lever is normally free to rock about the rod 6 as an axis. For the purpose, however, of carrying out my improved method, means are provided whereby the several levers may be so connected that they will move together about the fulcrum axis and for this purpose each arm of each lever is provided with an eye 10 through which locking rods 11 extend, said rods being of sufficient length to engage an eye 10 of each of the levers of the series when in operative position and being adapted to be readily withdrawn to permit free independent movement of each lever when desired.

Each of the levers is provided, at both ends, with a plurality of upwardly extending rods or pins 12, the aligned rods at opposite ends of the lever representing respectively the credit and debit columns of the same individual account of the nature or class of accounts that is represented by the lever. The number of pins 12 on each of the levers will vary according to the width of such lever and the number of individual accounts which are included in the class of accounts assigned to said lever.

For example, in the embodiment of the invention illustrated in which the lever 3 is intended to represent a "trading account" comprising three individual accounts designated severally as "sales"—"purchases"—and "gross profit or loss", such lever will have three pins or rods 12 adjacent the outer end of each arm thereof. The lever 4 representing, in the embodiment of the invention illustrated, a "profit or loss account" is shown as having seven rods or pins at each end thereof corresponding to the individual accounts composing said "profit or loss account" and which for convenience, or to facilitate the use of the apparatus, are severally designated as shown on Figure 2.

Similarly the lever 5 representing in the embodiment of the invention illustrated a "balance sheet" is provided on each arm with ten of the rods or pins 12, each corresponding to a particular account.

It will be understood that it is not necessary to provide the several levers with inscriptions or legends indicating the particular individual accounts to which each pair of rods or pins 12 relates as the instructor, by whom the apparatus is to be used, may employ a single apparatus for use with any particular phase of bookkeeping, but the same are shown on the drawings to assist in explaining the invention and in order to clearly show the relation of the several levers and pins 12 to the divisions of the particular exercise sheet illustrated in Figure 5. Such sheet has a series of spaces to receive entries in each of the accounts represented by every pair of pins or rods 12 of the apparatus.

A series of weights 13 are provided, each being adapted to be applied to one of the rods 12 and corresponding to an entry made on an exercise sheet, such as illustrated in Figure 5, or in a set of books. Preferably, as shown, the weights are made in the form of apertured discs which can be readily slipped over or removed from the rods or pins 12. When not in use said discs are supported on standards 14 rising from the base 1 at one side of the apparatus.

It will be understood that each pupil is provided with an exercise sheet, such as shown in Figure 5, together with sheet of instructions embodying a few simple but essential rules of bookkeeping, as for example:

Improved "Balance" Method for Teaching Bookkeeping.

| Left hand side. | Right hand side. |
|---|---|
| Debit or Dr. | Credit or Cr. |
| "To" | "By" |
| Golden rule. | Golden rule. |

Every debit must have a credit then the books must be in balance.

| Practical rules. | Practical rules. |
|---|---|
| 1. Debit what comes in. | 1. Credit what goes out. |
| 2.  " the receiver. | 2.  " the sender. |
| 3.  " the destination. | 3.  " the source. |
| 4.  " losses. | 4.  " gains. |

Assets are what the business has.
Liabilities are what the business owes.

The excess of the gains over the losses is the net profit and belongs to the owner, therefore, it is transferred to his account.

In carrying out the improved method and using the apparatus hereinbefore described the instructor will proceed as follows:

Preferably the several columns of the exercise sheet will be serially numbered and the transactions entered thereon in regular sequence or order. For simplicity the transactions are all expressed in multiples of one hundred dollars and as the spaces on the exercise sheet illustrated are small the various amounts are represented by the first figure in each instance. That is $500 is represented on the exercise sheet by —5—, $200. by —2—, etc.

Assuming that the exercise relates to the business of John Smith, who commences with a capital of $500, of which there is in cash $300 and in fixtures $200. The instructor will take 5 discs and place these on the credit pin 12 opposite the account designated "Capital" on lever 5. Following the rule of instruction that the pupil should credit the source, which, in this case, is John Smith's "Capital account." As the aforesaid capital is in the form of cash and fixtures, the instructor will place three discs on the pin 12 on the debit arm in alinement with the legend "Cash" which represents the "Cash column" in a cash book,—this being in accordance with instruction, to debit what comes in,—in this case "Cash." In the same way the instructor will also put two discs on the pin 12 on the debit arm in alignment with the legend "Fixtures." This also being in accordance with the instructions to debit what has come in, namely: "Fixtures."

Figure 2:
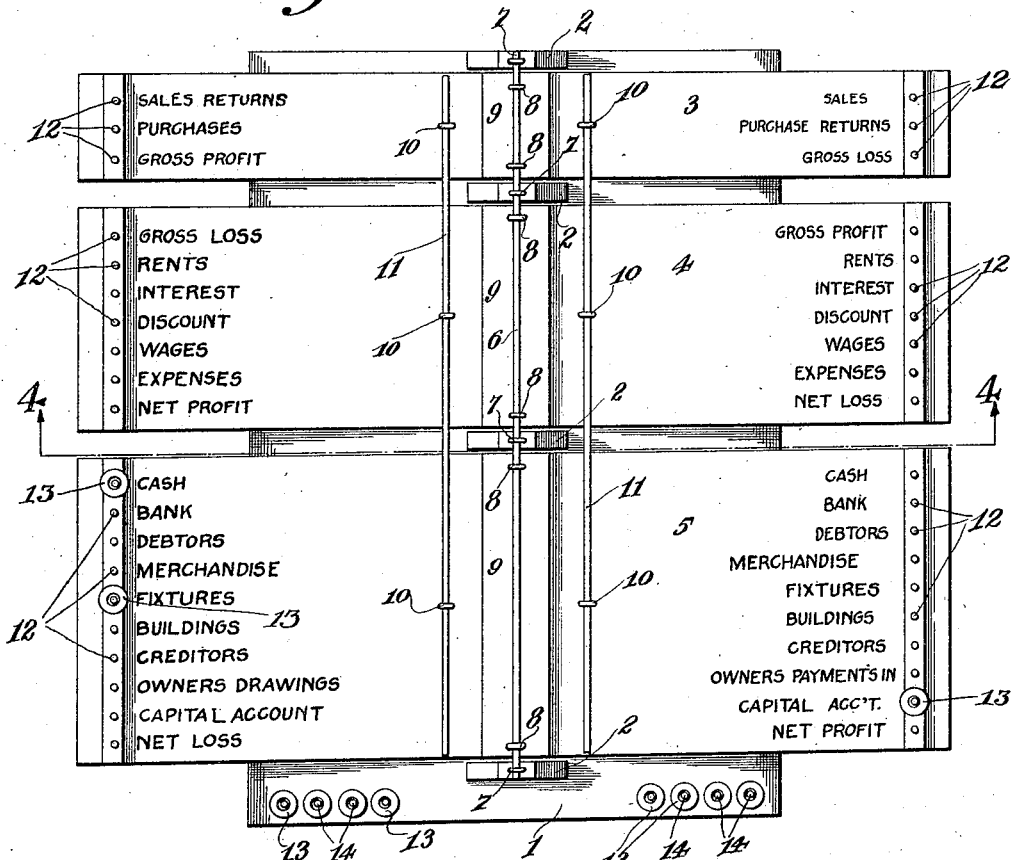
Figure 2 is a plan.

The pupils will enter the figure 5 (representing $500.00) in the space 1 on the credit side of the exercise sheet, under the heading "Transactions" opposite the word "Capital," and will on the debit side opposite the words "Cash" and "Fixtures" enter the figures 3 and 2 respectively. These represent $300.00 and $200.00.

It will be noticed that the spaces under the words "Transactions" on the dr. or cr. side of the exercise sheet are consecutively numbered from 1 to 9, commencing with number 1 at the centre and working outwards. This is done for the purpose of enabling the pupils to put the transactions down in their proper numerical order. Thus, the first transaction is number 1 and the pupils will therefore put the figures in connection therewith in the spaces in column 1.

At this point the instructor will show that he has 5 discs on the cr. side opposite the heading "Capital" and 5 discs on the dr. side, and the pupils will see by referring to transaction number 1 that the total of the entries on the dr. and cr. side is also 5 and that, therefore, as the apparatus which the instructor uses is in actual physical balance, because there is an equal number of discs on each side of the levers, similarly their exercises sheet is in actual arithmetical balance, because the amounts on either side, when summed, balance.

*Transaction #2.*—John Smith bought goods to the extent of $200. and paid for them in cash. The rule 5 provides that "what comes in is to be debited," in this case goods or purchases came in, and, therefore, the instructor will place 2 discs, each representing $100 on the dr. side opposite the work "purchases" on lever #3. The rule further provide that what goes out is to be credited, and as in this case it is cash that went out, the instructor will place 2 discs on the credit pin opposite the legend "Cash" on lever #5. The pupils will have explained to them carefully the rules and will make under space 2 in the transactions on the exercise sheet the corresponding entries to that which the instructor has just made on the apparatus.

It will be pointed out to them at the close of this and also every other transaction that the apparatus is in actual physical balance and that at the close of any transaction their exercise sheets should be in arithmetical balance.

*Transaction #3.*—Mr. Smith made a cash sale of goods $100. In this case goods went out, so he will put one disc on the credit pin opposite the word "Sales" on lever #3 and will put one disc on the dr. pin opposite the word "Cash" on lever #5. The pupils will make the corresponding entries in their sheets in space 3 of their transactions.

*Transaction #4.*—He sold goods to a customer on credit to the extent of $200. Instructor will put 2 discs on the credit sales pin lever #3, and 2 discs on the dr. pin opposite legend "Debtor" on lever #5. The pupils entering these and all subsequent transactions will understand that they are in accordance with instructions previously detailed.

*Transaction #5.*—A customer paid on account in cash $100. One disc will be placed on the cr. pin of the "Debtors" account and one disc on the dr. pin of the "Cash" account in accordance with rules laid down.

*Transaction #6.*—John Smith purchases goods on credit $500. The instructor will place 5 discs on the dr. pin opposite "purchases" account on lever #3 and will place 5 discs on the credit pin opposite legend "Creditors", lever #5.

*Transaction #7.*—John Smith sold goods for cash $400. The instructor will place 4 discs on the credit "sales" pin lever #4 and 4 discs on the dr. "cash" pin lever #5.

*Transaction #8.*—Paid expense of store in cash $200. The instructor will place 2 discs on the cr. "Cash" pin, lever number 5 and 2 discs on the dr. pin opposite legend "Expenses", lever #4, in accordance with the rule to dr. destination.

*Transaction #9.*—He sold goods to a customer on credit $500. The instructor will place five discs on the credit pin opposite the legend "Sales", and five discs on the dr. pin opposite the legend "Debtors", on lever #5.

In tabulated forms the several transactions just referred to will appear as:

|   |   | Dr. | Cr. |
|---|---|---|---|
| 1 | John Smith commences business with a capital of |  | $500 |
|   | of which—<br>In cash<br>In fixtures | $300<br>200 |  |
| 2 | He bought goods to extent of and paid for them in cash | 200 | 200 |
| 3 | He sold goods and received payment in cash | 100 | 100 |
| 4 | He sold goods to extent of to a customer or debtor on credit | 200 | 200 |
| 5 | The customer paid on account in cash | 100 | 100 |
| 6 | John Smith purchased goods on credit from a creditor | 500 | 500 |
| 7 | He sold goods For cash | 400 | 400 |
| 8 | He paid expenses of store In cash | 200 | 200 |
| 9 | He sold goods to the customer on credit | 500 | 500 |
|   |   | 2,700 | 2,700 |

The pupils have made corresponding entries in their exercise sheets for all the foregoing transactions and the instructor will now proceed to count up the number of discs on the various pins on the apparatus. At the same time the pupils will sum vertically the various amounts opposite the accounts in their exercise sheets, putting down the total of the dr. transactions in the column marked "totals" on the dr. side, and putting down the total of the various credit transactions in the column marked "Totals" on the credit side, care to be taken to see that they put the proper totals opposite the proper accounts. Thus the total of the sales on the credit side will be put in the cr. "Total" column opposite the words "Sales", while the total of the columns of the dr. side would be put in the total dr. column opposite the word "Purchases". The pupils will then be asked to compare the totals which they have with the number of discs which the instructor has on the various pins in the apparatus and these should in every case be found to agree, because the pupils have only put on their exercise sheets the arithmetical record of the transactions which the instructor has demonstrated on the apparatus.

The instructor will have on the debit side of the various levers 7 discs on the pin of the "Purchases" column; 2 discs on the pin of the "Expenses" column; 9 discs on the pin of the "Cash" column; 7 discs on the pin of the "Debtors" column; and 2 discs on the pin of the "Fixtures" column, altogether the total number of debits being 27 which equals the total of the transactions as shown on specimen sheet of transactions.

On the credit side he will have on the pin representing "Sales" 12 discs; on the pin representing "Cash" 4 discs; on the pin representing "Debtors" 1 disc; on the pin representing "Creditors" 5 discs, and on the pin representing "Capital" 5 discs, a total of 27 discs on the credit side which equals the number of discs on the debit pins.

The pupils will again have pointed out to them the fact that the apparatus is in physical balance visible to the eyesight and they will be asked to sum the various totals in the total columns of the dr. and cr. side respectively and these they will find will amount to 27 in each case. Thus it is made plain to them, both by means of the appeal to the eye and the appeal to the mind that there have to be equal weights on both sides of a balance and that there will have to be equal amounts on either side of books of account so that the books may balance.

It will be understood that every time the instructor places a disc upon either arm of any of the levers the pupil will make a proper, corresponding, entry on the exercise sheet.

As the instructor has placed a disc on each side of the machine when respresenting each transaction and as the several levers are all connected by the rods 11, it is evident that the several connected levers will be in balance at all times and as the pupils have only made the entries given by the instructor, it is clear that the sum total of the debits on the exercise sheet will equal the sum total of the credit entries on that sheet.

Therefore, there is visibly demonstrated to the pupil the meaning of the expression "keeping books in balance" and also what is meant by the rule that "every debit must have a credit."

Subsequently the instructor will find the balance between the debit and credit totals of each particular account, represented by the apparatus, by taking off from the pin or rod 12 of that account having the lesser value the discs and then taking off from the other pin of said account an equivalent value in discs. After this has been done with all of the pins the apparatus will only contain the debit or credit balances of the respective accounts concerned but will still be in balance because equivalent amounts have been removed from both sides.

The pupils will be shown how to deduct the lesser total from the greater total in their exercise sheet and to enter the excess of the greater over the lesser, namely, the "balance" in the balance column of the greater side. Such balance must equal the amount which the instructor has represented by discs on the particular pin concerned.

The pupils will ascertain the total of the debit balances and the total of the credit balances and these will agree so that they will quite readily see what is meant by a "trial balance."

At this stage the instructor will withdraw the rods 11 connecting the several levers. The result will be that each lever will no longer balance, but the excess of balance on one side will equal the excess of balance on the other side and the pupils will be made to realize that it is the books, as a whole, that balance, and that consequently for books to be correct the twofold nature of every transaction must be properly twice recorded. When the rods 11 are thus withdrawn the levers 3 and 4 will assume the positions shown in Figure 4.

The instructor will then instruct the pupils to extend the debit or credit balances in the "trading account" (represented by the lever 3) and the "profit and loss account" (represented by the lever 4) into the respective loss and gain columns of their exercise sheets.

The instructor will then proceed to close the "trading account" by taking from the purchases and sales pins respectively the amount of the lesser side. The value of the discs left will then be transferred to the proper pins in the "gross profit or loss account" showing the result of the trading for the period to which the exercise relates. After the pupils have made corresponding entries on their exercise sheets, the instructor will transfer the balance on the "gross profit or loss pins" in the "trading account" to the proper gross profit or loss pin in the "profit or loss account." Then he will balance the latter account in a manner before described and the pupils will make the required entries on their exercise sheets.

Then the instructor will transfer the excess discs on the net profit or loss pin in the "profit and loss account" to the proper pin of the "balance sheet section" (represented by the lever 5). At this time there will be no discs on any of the pins of the levers 3 and 4 representing respectively the "trading account" or the "profit and loss account", but by transferring discs from the lever 4 representing the "profit or loss account" to the proper pin on the lever 5 representing the "balance sheet", this lever which was previously out of balance will be brought into balance and the pupils will see how the difference between assets and liabilities must be the profit or loss for the period.

For the purpose of the transactions which I have worked out, I have assumed the discs to be all of equal value and weight and representing the same value, but this is not necessary as discs of varying weights may be used so long as the ratio between the weights and the values is preserved. Thus, one disc might be exactly five times the weight of five other discs each of which represent 100. In this case the heavier disc would naturally represent 500, and thereby greater facility would be obtained and time saved in handling the discs, while at the same time it would be brought home to the pupils that it does not matter how amounts are broken up and entered on either side so long as the total amount on the debit side equals the total amount on the credit side.

It will be evident that the machine may be used to demonstrate any particular phase of bookkeeping, as for instance—exercises in customers accounts or creditors account, bills receivable or bills payable, purchases or sales, cash or bank; and as the machine is always in balance and the pupils report only what is on the machine, their exercise sheets must also be in balance. Therefore, the minds of the pupils are not confused with the difficulties of trying to distinguish between single and double entry, and, furthermore, they learn at once the twofold nature of every financial transaction and how to record it.

While I have shown a particular construction for carrying out my invention, it will be understood that such variations in mechanical structure from the present disclosure as involve only mechanical skill may be made without departing from the range of my invention.

Having thus described the invention, what is claimed is:—

1. A means for teaching bookkeeping comprising a normally balanced lever, having associated therewith indicia showing that the arms thereof represent, respectively, the debit and credit sides of an account, and a series of sets of duplicate weights, the members of each set being adapted to be respectively applied to the arms of said lever to indicate the debit and credit entries of each transaction referred to on an exercise sheet or in a set of books.

2. A means for teaching bookkeeping comprising a normally balanced lever having associated therewith indica showing that the arms thereof represent, respectively, the debit and credit sides of an account, and provided on each arm with means for retaining a plurality of weights, and a series of sets of duplicate weights adapted to be placed upon the arms of said lever, the members of each said sets of weights representing, respectively, the credit and debit entries of each transaction noted on an exercise sheet or in a set of books.

3. A means for teaching bookkeeping comprising a normally balanced lever having associated therewith indicia showing that the arms thereof represent, respectively, the debit and credit sides of an account and provided on each arm an upwardly projecting pin, and a series of sets of duplicate apertured weights each adapted to be slipped over either of the pins on said lever, the members of each set representing, respectively, the debit and credit entries of each transaction noted on an exercise sheet or in a set of books.

4. A means for teaching bookkeeping comprising a lever having each arm provided with a plurality of weight retaining means, corresponding means on the two arms representing a single account, and a series of weights adapted to be applied to the arms of the lever and each representing an entry on an exercise sheet or in a set of books.

5. A means for teaching bookkeeping comprising a normally balanced lever having each arm provided with a plurality of weight retaining pins, corresponding pins on the two arms representing an individual account of the total account to which the lever refers, and a series of weights each adapted to be engaged with one of said pins and representing an entry on an exercise sheet or in a set of books.

6. A means for teaching bookkeeping comprising a plurality of levers mounted to rock about a common axis and adapted to be connected to vibrate together, and a series of weights adapted to be applied to either arm of any of the levers and each representing an entry on an exercise sheet or in a set of books.

7. A means for teaching bookkeeping comprising a plurality of levers mounted to rock about a common axis and adapted to be connected to vibrate together, each arm of each of said levers being provided with means for retaining a plurality of weights thereon, and a series of weights, each representing an entry on an exercise sheet or in a set of books, adapted to be engaged with said retaining means of any of the levers.

8. A means for teaching bookkeeping comprising a plurality of levers each representing a special account, a series of weights each adapted to be applied to either arm of any of said levers and representing an entry on an exercise sheet or in a set of books, and means for connecting said levers so that they will vibrate in unison.

9. A means for teaching bookkeeping comprising a plurality of levers, each representing a special account, supported to rock about a common axis, a series of weights each adapted to be applied to either arm of any of said levers and representing an entry on an exercise sheet or in a set of books, and means for connecting said levers, whereby they will all move together.

10. A means for teaching bookkeeping comprising a plurality of levers, each representing a special account, supported to rock about a common axis, a series of weights each adapted to be applied to either arm of any of said levers and representing an entry on an exercise sheet or in a set of books, and means adjustable transversely of said levers for connecting all of them together.

11. A means for teaching bookkeeping comprising a lever, the arms of which represent, respectively, the credit and debit columns of an account, and a series of weights adapted to be applied to either arm of the lever and representing items relating to said account.

12. A means for teaching bookkeeping comprising a lever, the arms of which represent, respectively, the credit and debit columns of a general account, each arm being provided with a corresponding plurality of weight engaging means representing a number of individual accounts, and a series of weights representing items relating to said accounts and adapted to be engaged by any of said means.

13. A means for teaching bookkeeping comprising a plurality of levers arranged side by side to rock about a common axis, each of said levers representing a general account and having both arms provided with a corresponding plurality of weight engaging means representing individual accounts, a series of weights representing items relating to said accounts and adapted to be engaged by any of said means, and means for connecting said levers so that they will vibrate together.

14. A means for teaching bookkeeping comprising a plurality of levers arranged side by side to rock about a common axis, each of said levers representing a general account and having both arms provided with a corresponding plurality of upwardly projecting pins or studs and representing individual accounts, a series of apertured discs adapted to be fitted about any of said pins to represent items of the particular account, and means for connecting said levers so that they will vibrate together.

In testimony whereof I have hereunto set my hand.

FREDERICK TOD.